US008612378B2

(12) United States Patent
Pichon et al.

(10) Patent No.: US 8,612,378 B2
(45) Date of Patent: Dec. 17, 2013

(54) METHOD, DEVICE AND SYSTEM FOR MERGING INFORMATION FROM SEVERAL SENSORS

(75) Inventors: Frédéric Pichon, Paris (FR); Thierry Denoeux, Compiegne (FR)

(73) Assignees: Thales & Universite de Technologie, Neuilly sur Seine (FR); DE Compiegne -UMRCNRS, Compiegne Cedex (FR)

( * ) Notice: Subject to any disclaimer, the term of this patent is extended or adjusted under 35 U.S.C. 154(b) by 632 days.

(21) Appl. No.: 12/670,903

(22) PCT Filed: Jul. 23, 2008

(86) PCT No.: PCT/EP2008/059660
§ 371 (c)(1),
(2), (4) Date: Jun. 30, 2010

(87) PCT Pub. No.: WO2009/016080
PCT Pub. Date: Feb. 5, 2009

(65) Prior Publication Data
US 2011/0010329 A1  Jan. 13, 2011

(30) Foreign Application Priority Data
Jul. 27, 2007 (FR) .................................... 07 05528

(51) Int. Cl.
*G06F 9/44* (2006.01)
*G06N 7/02* (2006.01)
*G06N 7/06* (2006.01)

(52) U.S. Cl.
USPC ........................................................ 706/52

(58) Field of Classification Search
None
See application file for complete search history.

(56) References Cited

U.S. PATENT DOCUMENTS

| 6,601,012 | B1* | 7/2003 | Horvitz et al. ................ 702/150 |
| 7,542,952 | B2* | 6/2009 | Yang et al. ...................... 706/45 |
| 2007/0156720 | A1* | 7/2007 | Maren ........................... 707/100 |
| 2008/0040305 | A1* | 2/2008 | Yang et al. ...................... 706/46 |

OTHER PUBLICATIONS

Smets "Belief Functions: The Disjunctive Rule of Combination and the Generalized Bayesian Theorem", International Journal of Approximate Reasoning, 1993, 35 pages.*
Smets, "The Application of the Matrix Calculus to Belief Functions", Elsevier Science, 2002, 30 pages.*
Smets, "Data Fusion in the Transferrable Belief Model", ISIF, 2000, pp. PS-21-PS-33.*
Smets et al. "The Transferrable Belief Model", Université Libre de Bruxelles, 1999, 45 pages.*
'Demining sensor modeling and feature level fusion by Bayesian networks': Ferrari, 2006, IEEE, 1530-437, pp. 471-483.*

(Continued)

*Primary Examiner* — Kakali Chaki
*Assistant Examiner* — Peter Coughlan
(74) *Attorney, Agent, or Firm* — LaRiviere, Grubman & Payne, LLP

(57) ABSTRACT

The invention relates to a method, a device and a system for merging information originating from several non-independent sensors. This invention makes it possible to prevent the same item of information from being reckoned twice during merging. The solution afforded consists of the creation of a new combination operator applying to latent belief structures. Said latent belief structures are obtained previously from conventional belief functions. These conventional belief functions are produced directly on the basis, for example, of the sensors of the system. The invention also proposes a means of transforming these latent belief structures into a probability distribution useful for decision taking.

8 Claims, 2 Drawing Sheets

(56) References Cited

OTHER PUBLICATIONS

'On latent belie structures': Pichone, 2007, SPringer, ECSQARU, 2007, LNAI 4724, pp. 368-380.*

'The canonical decomposition of a weighted belief': Smets, International joint conference of artificial intelligence 1995.*

* cited by examiner

METHOD, DEVICE AND SYSTEM FOR MERGING INFORMATION FROM SEVERAL SENSORS

PRIORITY CLAIM

This application claims priority to PCT Patent Application Number PCT/EP2008/059660, entitled Procédé, Dispositif Et Système Pour La Fusion D'informations Provenant De Plusieurs Capteurs, filed Jul. 23, 2008, also claiming priority to FR 07 05528, filed Jul. 27, 2007.

TECHNICAL FIELD

The invention relates to the merging of information originating from several sensors and more particularly to the merging of imperfect information originating from non-independent sources.

BACKGROUND OF THE INVENTION

Systems integrating several sensors are used in a great variety of fields such as site surveillance, maintenance, robotics, medical diagnosis or meteorological forecasting. Such systems for example carry out classification, identification and tracking functions in real time.

To derive the best from multi-sensor systems, it is necessary to use an effective information merging scheme to combine the data originating from the various sensors of the system and generate a decision.

According to the known art, certain information merging schemes rely on Dempster-Shafer theory (theory generalizing probability theory) and thus use belief functions. Belief functions are known for their ability to faithfully represent imperfect information. Information comprising an inaccuracy or an uncertainty or incomplete information is called imperfect information. The sensors of a system are considered to be sources of imperfect information, notably because of their inaccuracy. The term sensor is intended here in the broad sense. It includes physical devices for data acquisition (camera, radar, etc.) but also devices for processing these data. It is possible to establish a belief function on the basis of the data provided by most commercially available sensors. Belief combining schemes can be used. By their very nature these schemes are therefore particularly appropriate to the problem of the merging of imperfect information arising from sensors.

A belief function can be represented with the aid of a function m called the mass distribution defined on a set of proposals $\Omega$ which is a space of possible worlds with finite cardinal. It associates degrees of belief, lying between 0 and 1, with parts A (groups of proposals, also called subsets) of $\Omega$. These degrees of belief are determined on the basis of the available information. The set of parts of $\Omega$ is denoted $2^\Omega$.

A mass distribution m satisfies the following two conditions:
  the mass ascribed to a subset A lies between 0 and 1:
    $0 \leq m(A) \leq 1$, $\forall A \subseteq \Omega$.
  the sum of the masses of all the subsets is equal to one:

$$\sum_{A \subseteq \Omega} m(A) = 1$$

A multi-sensor system of classifier type used for the optical recognition of handwritten characters may be considered by way of nonlimiting example. It is assumed that the system is intended to determine whether the character formed on an image I is one of the letters 'a', 'b' or 'c'. We therefore have a set of proposals $\Omega = \{a, b, c\}$. Each of the sensors of the system is a classifier which itself provides an item of information about the character to be recognized in the form of a belief function. It is assumed that there are two sensors of this type in our example. The following table gives an example of a belief function $m_1$ produced by a first sensor of the system and defined on $2^\Omega$.

| A | $m_1(A)$ |
|---|---|
| $\emptyset$ | 0 |
| {a} | 0 |
| {b} | 0 |
| {a, b} | 0.4 |
| {c} | 0 |
| {a, c} | 0 |
| {b, c} | 0.4 |
| $\Omega$ | 0.2 |

In this example, the sensor considers that it is as probable that the character to be recognized belongs to {a, b} as that it belongs to {b, c}. ($m_1(\{a, b\}) = m_1(\{b, c\}) = 0.4$). $m_1(\Omega) = 0.2$ represents the ignorance, that is to say the share of doubt, of the sensor.

Dempster-Shafer theory makes it possible to combine the belief functions representing information arising from different sources, so as to obtain a belief function that takes into account the influences of each of the sources. The belief function thus obtained represents the combined knowledge of the various sources of imperfect information (the sensors).

However, systems relying on this theory are based on the assumption that the merged information is independent. In practice two items of information can be considered to be independent if the sources associated with these items of knowledge are wholly unrelated. The concept of independence is fundamental since one of the constraints of information merging is to avoid counting the same item of information twice. It is obvious that this independence assumption is not satisfied by a certain number of multi-sensor systems. For example in the problem of the optical recognition of handwritten characters, the sensors may not be independent. Indeed, according to the known art, shape recognition schemes rely on automatic learning techniques using learning bases. If the sensors have been trained on the same learning bases, that is to say if the sensors have been set up using the same data, then the independence assumption required by the known art merging systems is not satisfied and therefore these systems may not be used.

SUMMARY OF THE INVENTION

The invention is aimed notably at alleviating the problem cited previously by proposing a method, a device and a system for merging information originating from several non-independent sensors. This invention makes it possible to prevent the same item of information from being reckoned twice during merging. The solution afforded consists of the creation of a new combination operator applying to latent belief structures. Said latent belief structures are obtained previously from conventional belief functions. These conventional belief functions are produced directly on the basis, for example, of the sensors of the system. The invention also proposes a means of transforming these latent belief structures into a probability distribution useful for decision taking.

For this purpose, the subject of the invention is a method for merging information originating from several sensors $c_1$, $c_2$, ..., $c_n$, n being the number of sensors, said method comprising the following steps:

the acquisition of belief functions $m_1, m_2, \ldots, m_n$ arising from the sensors $c_1, c_2, \ldots, c_n$, said belief functions $m_1, m_2, \ldots, m_n$ being defined on a set of proposals $\Omega$, wherein $\Omega$ is a space of possible worlds with finite cardinality and wherein $\emptyset$ is the empty set, the calculation of latent belief structures $LBS_1$, $LBS_2, \ldots, LBS_n$ for each belief function $m_1, m_2, \ldots, m_n$, said latent belief structures $LBS_1, LBS_2, \ldots, LBS_n$ each comprising pairs of confidence and distrust functions $(w_1^c, w_1^d), (w_2^c, w_2^d), \ldots, (w_n^c, w_n^d)$, wherein said sensors $c_1, c_2, \ldots, c_n$ are non-independent and wherein it furthermore comprises the following steps:

the calculation of a merged latent belief structure $LBS_m$, said merged latent belief structure $LBS_m$ comprising a pair of functions $w_m^c$ and $w_m^d$ calculated by applying a so-called weak-rule function to the confidence and distrust functions $(w_1^c, w_1^d), (w_2^c, w_2^d), \ldots, (w_n^c, w_n^d)$;

$$w_m^c(A) = w_1^c(A) \wedge w_2^c(A) \wedge \ldots \wedge w_n^c(A), A \subset \Omega$$

$$w_m^d(A) = w_1^d(A) \wedge w_2^d(A) \wedge \ldots \wedge w_n^d(A), A \subset \Omega$$

$w_m^c$ and $w_m^d$ being defined on all the subsets A of $\Omega$, the calculation of as probability distribution $P_m$ on the basis of the functions $w_m^c$ and $w_m^d$, the calculation of commonality functions $q_m^c$ and $q_m^d$ on the basis of the functions $w_m^c$ and $w_m^d$, the calculation of plausibility functions $pl_m^c$ and $pl_m^d$ on the basis of the commonality functions $q_m^c$ and $q_m^d$, by using the following equations:

$$pl_m^c(A) = \sum_{\emptyset = B \subseteq A} (-1)^{|B|+1} q_m^c(B), A \in 2^\Omega, pl_m^c(\emptyset) = 0$$

$$pl_m^d(A) = \sum_{\emptyset = B \subseteq A} (-1)^{|B|+1} q_m^d(B), A \in 2^\Omega, pl_m^d(\emptyset) = 0$$

wherein A and B are subsets of $\Omega$, $\emptyset$ is the empty set.

According to a variant of the invention, the acquisition of the belief functions is direct, said sensors $c_1, c_2, \ldots, c_n$ giving a belief function directly.

According to another variant of the invention, characterized in that the acquisition of the belief functions is indirect, said belief functions $m_1, m_2, \ldots, m_n$ being calculated on the basis of the information arising from the sensors $c_1, c_2, \ldots, c_n$.

According to a characteristic of the invention, the calculation of a probability distribution comprises the following steps:

the calculation of commonality functions $q_m^c$ and $q_m^d$ on the basis of the functions $w_m^c$ and $w_m^d$, the calculation of functions $pl_m^c$ and $pl_m^d$ on the basis of the commonality functions $q_m^c$ and $q_m^d$, the calculation of probability distributions $P_m^c$ and $P_m^d$ on the basis of the functions $pl_m^c$ and $pl_m^d$, the calculation of a merged probability distribution $P_m$ corresponding to the merged latent belief structure and calculated on the basis of the probability distributions $P_m^c$ and $P_m^d$.

According to a characteristic of the invention, the calculation of the commonality functions $q_m^c$ and $q_m^d$ uses the following equations:

$$q_m^c(B) = \prod_{B \not\subset A \subseteq \Omega} w_m^c(A)$$

$$q_m^d(B) = \prod_{B \not\subset A \subseteq \Omega} w_m^d(A)$$

According to a characteristic of the invention, the calculation of the functions $pl_m^c$ and $pl_m^d$ uses the following equations:

$$pl_m^c(A) = \sum_{\emptyset \neq B \subseteq A} (-1)^{|B|+1} q_m^c(B), \quad A \in 2^\Omega, \; pl_m^c(\emptyset) = 0$$

$$pl_m^d(A) = \sum_{\emptyset \neq B \subseteq A} (-1)^{|B|+1} q_m^d(B), \quad A \in 2^\Omega, \; pl_m^d(\emptyset) = 0$$

According to a characteristic of the invention, the calculation of the probability distributions $P_m^c$ and $P_m^d$ uses the following equations:

$$P_m^c(\{\omega_k\}) = \kappa^{-1} pl_m^c(\{\omega_k\}), \quad \forall \omega_k \in \Omega$$

$$\text{with } \kappa = \sum_{\omega_k \in \Omega} pl_m^c(\{\omega_k\})$$

$$P_m^d(\{\omega_k\}) = \kappa^{-1} pl_m^d(\{\omega_k\}), \quad \forall \omega_k \in \Omega$$

$$\text{with } \kappa = \sum_{\omega_k \in \Omega} pl_m^d(\{\omega_k\})$$

According to a characteristic of the invention, the calculation of the merged probability distribution $P_m$ uses the following equation:

$$P_m(\{\omega_k\}) = \kappa^{-1} P_m^c(\{\omega_k\}) / P_m^d(\{\omega_k\})$$

$$\text{with } \kappa = \sum_{\omega_k \in \Omega} P_m^c(\{\omega_k\}) / P_m^d(\{\omega_k\})$$

The subject of the invention is also a device for merging information comprising:

means for the acquisition of belief functions $m_1, m_2, \ldots, m_n$ on the basis of the information arising from sensors, means for merging the belief functions originating from the means for the acquisition, characterized in that the means for merging information implement the method according to the invention.

The subject of the invention is also a system for merging information comprising:

at least two sensors, collecting data and providing information, means for merging information originating from said sensors, said merging means being linked to the sensors, characterized in that said sensors are non-independent and in that the means for merging information comprise the device for merging information according to the invention.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION OF THE INVENTION

It is proposed to illustrate the method according to the invention, by way of nonlimiting example, with the previously mentioned multi-sensor system of classifier type used for the optical recognition of handwritten characters. It is assumed that the system is intended to determine whether the character formed on an image I is one of the letters 'a', 'b' or 'c'.

The term sensor is intended here in the broad sense. It includes physical devices for data acquisition (camera, micro, etc.) but also devices for processing these data, in the example: a classifier.

Figure 1:
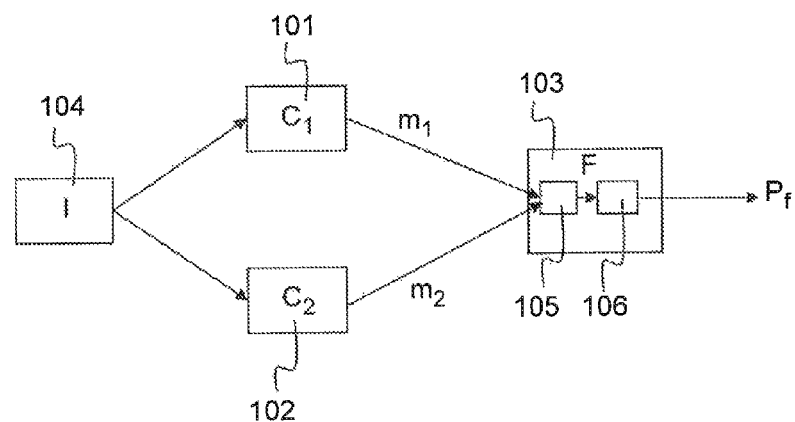
FIG. 1 represents an exemplary embodiment of a system for merging information according to the invention.

An exemplary embodiment of a system for merging information according to the invention is illustrated by FIG. 1. Such a system comprises a first classification system $C_1$ 101 and a second classification system $C_2$ 102. It is assumed that each of the two classification systems comprises a device allowing the acquisition of the image I 104 such as a video camera for example, and means for processing the signal comprising character recognition on the basis of the captured image I and the creation of a belief function m(A) indicating the degree of belief of the sensor in the alternatives ({a}, {b} and {c}) and in the sets of alternatives ({a,b}, {a,c}, and {b,c}).

According to the known art, shape recognition schemes rely on automatic learning techniques using predetermined learning bases. In this example, we assume that the two classification systems $C_1$ 101 and $C_2$ 102 are not independent since they have been trained on the same learning base. The independence assumption made in the merging systems according to the known art is therefore not satisfied.

The system furthermore comprises a device 103 for merging the information originating from the sensors $C_1$ and $C_2$. The device 103 for merging the information comprises:

means for the acquisition 105 of belief functions $m_1$, $m_2$, ..., $m_n$ arising from the sensors 101, 102, means 106 for merging the belief functions $m_1$, $m_2$, ..., $m_n$ originating from said sensors 101, 102.

The acquisition can be done in a direct manner when a sensor produces a belief function directly or in an indirect manner when the belief function is calculated on the basis of the information provided by the sensor.

These means 106 are noteworthy in that they implement the method according to the invention and in that they make it possible to calculate a probability distribution on the basis of the belief functions provided by the two non-independent sensors $C_1$ and $C_2$. The merging means 106 can be a computer or an integrated circuit implementing the method according to the invention.

The system must recognize in the acquired image one of the three letters 'a', 'b' or 'c'. We therefore have a set of proposals $\Omega = \{a, b, c\}$.

The table below presents the various intermediate calculations performed by applying the method according to the invention.

The first column contains the subsets of $\Omega$. The second and third columns contain the values of the functions $m_1(A)$, $m_2(A)$ provided by the two sensors.

| A | $m_1(A)$ | $m_2(A)$ | $w^c_1(A)$ | $w^d_1(A)$ | $w^c_2(A)$ | $w^d_2(A)$ | $w^c_m$ | $w^d_m$ | $P_m$ |
|---|---|---|---|---|---|---|---|---|---|
| ∅ | 0 | 0 | 1 | 1 | 1 | 1 | 1 | 1 | |
| {a} | 0 | 0 | 1 | 1 | 1 | 1 | 1 | 1 | 9/19 |
| {b} | 0 | 0 | 1 | 5/9 | 1 | 1 | 1 | 5/9 | 5/19 |
| {a, b} | 0.4 | 0 | 1/3 | 1 | 1 | 1 | 1/3 | 1 | |
| {c} | 0 | 0 | 1 | 1 | 1 | 5/9 | 1 | 5/9 | 5/19 |
| {a, c} | 0 | 0.4 | 1 | 1 | 1/3 | 1 | 1/3 | 1 | |
| {b, c} | 0.4 | 0.4 | 1/3 | 1 | 1/3 | 1 | 1/3 | 1 | |
| $\Omega$ | 0.2 | 0.2 | | | | | | | |

The method for merging information originating from several sensors according to the invention is applied hereinafter to the system comprising two sensors, said sensors being non-independent. However the method according to the invention can be applied to a system comprising a larger number of sensors.

Figure 2:
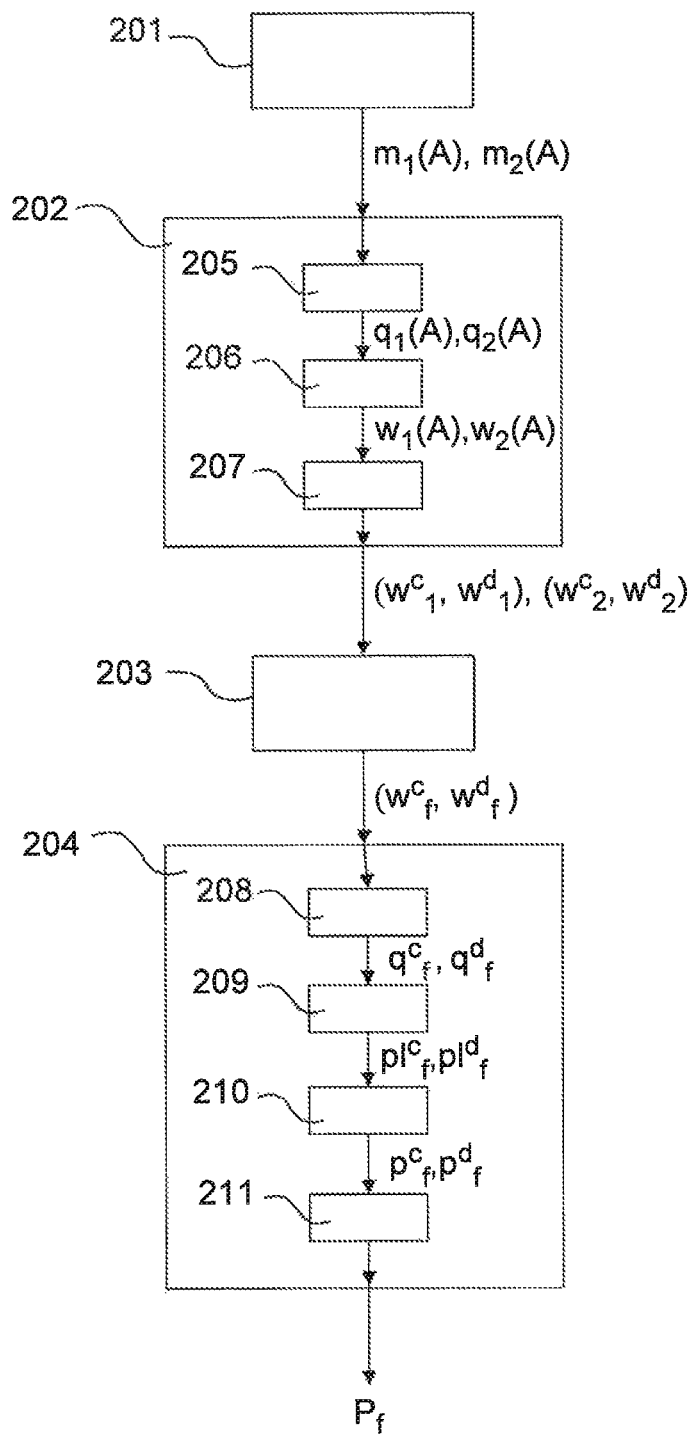
FIG. 2 represents a chart of the steps implemented in the method for merging information according to the invention.

FIG. 2 represents a chart of the steps implemented in the method for merging information according to the invention.

The first step 201 of the method according to the invention is the acquisition of the belief functions $m_1$, $m_2$ arising from the sensors. In the example, two functions $m_1$, $m_2$ are acquired, corresponding respectively to the two sensors $C_1$ and $C_2$. In this example, the first sensor $C_1$ considers that it is as probable that the character to be recognized belongs to {a, b} as that it belongs to {b, c}. ($m_1(\{a, b\}) = m_1(\{b, c\}) = 0.4$). $m_1(\Omega) = 0.2$ represents the ignorance, that is to say the share of doubt of the sensor. The second sensor $C_2$ considers that it is as probable that the character to be recognized belongs to {a, c} as that it belongs to {b, c}.

The second step 202 of the method according to the invention is the calculation of latent belief structures $LBS_1$ and $LBS_2$ for each belief function $m_1$, $m_2$ obtained on the basis of each of the sensors. Each of the latent belief structures $LBS_1$ and $LBS_2$ is calculated by using the canonical decomposition of a belief function. The canonical decomposition is a function denoted w and calculated on the basis of the belief function m by way of a function q called the commonality function. The canonical decomposition $w_1$ of the belief function $m_1$ is therefore calculated 206 on the basis of the function $q_1$. The function $q_1$ is calculated 205 with the following equation:

$$q_1(A) = \sum_{B \supseteq A} m_1(B), \quad A \in 2^\Omega$$

We have, for example, $q_1(\{a,b\}) = m_1(\{a,b\}) + m_1(\Omega) = 0.4 + 0.2 = 0.6$; $q_1(\Omega) = m_1(\Omega) = 0.2$.

The function is $w_1$ calculated 206 with the following equation:

$$w_1(A) = \prod_{B \supseteq A} q_1(B)^{(-1)^{(|B|-|A|+1)}}, \quad A \in 2^\Omega \setminus \{\Omega\}$$

where the operator $|A|$ represents the cardinal of the set A. We have for example:

$$w_1(\{a, b\}) = q_1(\{a, b\})^{(-1)^{(|\{a,b\}|-|\{a,b\}|+1)}} \times q_1(\Omega)^{(-1)^{(|\Omega|-|\{a,b\}|+1)}}$$

$$= 0.6^{(-1)^{(2-2+1)}} \times 0.2^{(-1)^{(3-2+1)}}$$

$$= \frac{0.2}{0.6}$$

$$= 1/3$$

The canonical decomposition $w_2$ of the belief function $m_2$ is calculated in a similar manner.

A latent belief structure $LBS_1$ is a pair of functions $w_1^c$ and $w_1^d$ representing respectively the confidence and the distrust for a given set A. The calculation 207 of the functions $w_1^c$ and $w_1^d$, whose values appear in the fourth and fifth columns of the above table, uses the following equations:

$$w_1^c(A) = 1 \wedge w_1(A), \quad A \in 2^\Omega \setminus \{\Omega\}$$

$$w_1^d(A) = 1 \wedge \frac{1}{w_1(A)}, \quad A \in 2^\Omega \setminus \{\Omega\}$$

where the operator $\wedge$ is the minimum between two values. We have, for example, $$w_1^c(\{a, b\}) = 1 \wedge w_1(\{a, b\})$$

$$= 1 \wedge 1/3$$

$$= 1/3 \text{ and } w_1^d(\{a, b\})$$

$$= 1 \wedge \frac{1}{w_1(\{a, b\})}$$

$$= 1 \wedge \frac{1}{1/3}$$

$$= 1$$

We proceed in a similar manner to calculate the functions $w_2^c$ and $w_2^d$ whose values appear in the sixth and seventh columns of the above table.

The method according to the invention is noteworthy in that it furthermore comprises the following steps.

The third step 203 of the method according to the invention is the calculation of a merged latent belief structure $LBS_m$ by applying a rule called a weak rule to the values calculated in the previous step 202. The merged latent belief structure $LBS_m$ takes the form of a pair of functions $w_m^c(A)$ and $w_m^d(A)$. The weak rule is defined by:

$$w_m^c(A) = w_1^c(A) \wedge w_2^c(A), \quad A \in 2^\Omega \setminus \{\Omega\}$$

$$w_m^d(A) = w_1^d(A) \wedge w_2^d(A), \quad A \in 2^\Omega \setminus \{\Omega\}$$

The fourth step 204 of the method according to the invention is the calculation of a probability distribution $P_m$ on the basis of the merged latent belief structure $LBS_m$.

According to the known art, it is possible to obtain a probability distribution on the basis of a mass distribution. The LBS obtained in the previous step 203 can be converted into a mass distribution, however this mass distribution is potentially signed, that is to say it can take its values in the set of reals IR rather than in the interval [0,1]. Now, the scheme according to the known art for obtaining a probability distribution on the basis of a mass distribution is not applicable to signed mass distributions. The method according to the invention is noteworthy in that it makes it possible to calculate a probability distribution directly on the basis of the merged LBS, that is to say without needing to calculate an intermediate mass distribution.

The calculation 204 of a probability distribution $P_m$ on the basis of the merged latent belief structure comprises the following sub-steps.

The first sub-step 208 is the calculation of the commonality functions corresponding to the functions $w_m^c$ and $w_m^d$ calculated previously and complying with the following equations:

$$q_m^c(B) = \prod_{B \not\subset A \subset \Omega} w_m^c(A)$$

$$q_m^d(B) = \prod_{B \not\subset A \subset \Omega} w_m^d(A)$$

We have for example:

$$q_m^c(\{a, b\}) = w_m^c(\emptyset) w_m^c(\{a\}) w_m^c(\{b\}) w_m^c(\{c\}) w_m^c(\{a, c\}) w_m^c(\{b, c\})$$

$$= 1 * 1 * 1 * 1 * \frac{1}{3} * \frac{1}{3}$$

$$= \frac{1}{9}$$

and $$q_m^d(\{a, b\}) = w_m^d(\emptyset) w_m^d(\{a\}) w_m^d(\{b\}) w_m^d(\{c\}) w_m^d(\{a, c\}) w_m^d(\{b, c\})$$

$$= 1 * 1 * \frac{5}{9} * \frac{5}{9} * 1 * 1$$

$$= \frac{25}{81}$$

The second sub-step 209 is the calculation of the plausibility functions $pl_m^c$ and $pl_m^d$ on the basis of the commonality functions $q_m^c$ and $q_m^d$ calculated previously and complying with the following equations:

$$pl_m^c(A) = \sum_{\emptyset \neq B \subseteq A} (-1)^{|B|+1} q_m^c(B), \quad A \in 2^\Omega, \; pl_m^c(\emptyset) = 0$$

$$pl_m^d(A) = \sum_{\emptyset \neq B \subseteq A} (-1)^{|B|+1} q_m^d(B), \quad A \in 2^\Omega, \; pl_m^d(\emptyset) = 0$$

We have for example:

$$pl_m^c(\{a\}) = q_m^c(\{a\}) = \frac{1}{3}$$

The function $pl_m^d$ is then calculated in a similar manner.

The third sub-step 210 is the calculation of the probability distributions $P_m^c$ and $P_m^d$ on the basis of the plausibility functions $pl_m^c$ and $pl_m^d$ calculated previously. This is done via the following equations:

$$P_m^c(\{\omega_k\}) = \kappa^{-1} pl_m^c(\{\omega_k\}), \forall \omega_k \in \Omega \text{ with } \kappa = \sum_{\omega_k \in \Omega} pl_m^c(\{\omega_k\})$$

We have for example:

$$P_m^c(\{a\}) = \frac{pl_m^c(\{a\})}{pl_m^c(\{a\}) + pl_m^c(\{b\}) + pl_m^c(\{c\})} = \frac{\frac{1}{3}}{\frac{1}{3} + \frac{1}{3} + \frac{1}{3}} = \frac{1}{3}$$

The function $P_m^d$ is then calculated in a similar manner.

The fourth sub-step 211 is the calculation of a probability distribution $P_m$ corresponding to the merged latent belief structure $LBS_m$ and calculated on the basis of the probability distributions $P_m^c$ and $P_m^d$:

$$P_m(\{\omega_k\}) = \kappa^{-1} P_m^c(\{\omega_k\}) / P_m^d(\{\omega_k\})$$
$$\text{with } \kappa = \sum_{\omega_k \in \Omega} P_m^c(\{\omega_k\}) / P_m^d(\{\omega_k\})$$

We therefore have:

$$P_m(\{a\}) = \frac{P_m^c(\{a\})/P_m^d(\{a\})}{P_m^c(\{a\})/P_m^d(\{a\}) + P_m^c(\{b\})/P_m^d(\{b\}) + P_m^c(\{c\})/P_m^d(\{c\})}$$

$$= \frac{\left(\frac{1}{3}\right)/\left(\frac{5}{23}\right)}{\left(\frac{1}{3}\right)/\left(\frac{5}{23}\right) + \left(\frac{1}{3}\right)/\left(\frac{9}{23}\right) + \left(\frac{1}{3}\right)/\left(\frac{9}{23}\right)}$$

$$= \frac{\frac{23}{15}}{\frac{437}{135}}$$

$$= \frac{9}{19}$$

Likewise, we calculate $P_m(\{b\})$ and $P_m(\{c\})$:

$$P_m(\{b\}) = P_m(\{c\}) = \frac{5}{19}$$

The probability distribution $P_m$ corresponding to the example is given in the tenth column of the above table. The conclusion of the multi-sensor system according to the invention is that the most probable character on the image 1 is 'a'.

The invention claimed is:

1. A method for merging information originating from several sensors $c_1, c_2, \ldots, c_n$, n being the number of sensors, said method comprising the following steps:
   the acquisition of belief functions $m_1, m_2, \ldots, m_n$ arising from the sensors $c_1, c_2, \ldots, c_n$, said belief functions $m_1, m_2, \ldots, m_n$ being defined on a set of proposals $\Omega$, wherein $\Omega$ is a space of possible worlds with finite cardinality and wherein $\emptyset$ is the empty set,
   the calculation of latent belief structures $LBS_1, LBS_2, \ldots, LBS_n$ for each belief function $m_1, m_2, \ldots, m_n$, said latent belief structures $LBS_1, LBS_2, \ldots, LBS_n$ each comprising pairs of confidence and distrust functions $(w_1^c, w_1^d), (w_2^c, w_2^d), \ldots, (w_n^c, w_n^d)$,
   wherein said sensors $c_1, c_2, \ldots, c_n$ are non-independent and wherein it furthermore comprises the following steps:
   the calculation of a merged latent belief structure $LBS_m$, said merged latent belief structure $LBS_m$ comprising a pair of functions $w_m^c$ and $w_m^d$ calculated by applying a so-called weak-rule function to the confidence and distrust functions $(w_1^c, w_1^d), (w_2^c, w_2^d), \ldots, (w_n^c, w_n^d)$:

$$w_m^c(A) = w_1^c(A) \wedge w_2^c(A) \wedge \ldots \wedge w_n^c(A), A \subset \Omega$$

$$w_m^d(A) = w_1^d(A) \wedge w_2^d(A) \wedge \ldots \wedge w_n^d(A), A \subset \Omega$$

$w_m^c$ and $w_m^d$ being defined on all the subsets A of $\Omega$,
the calculation of a probability distribution $P_m$ on the basis of the functions $w_m^c$ and $w_m^d$,
the calculation of commonality functions $q_m^c$ and $q_m^d$ on the basis of the functions $w_m^c$ and $w_m^d$,
the calculation of plausibility functions $pl_m^c$ and $pl_m^d$ on the basis of the commonality functions $q_m^c$ and $q_m^d$, by using the following equations:

$$pl_m^c(A) = \sum_{\emptyset \neq B \subseteq A} (-1)^{|B|+1} q_m^c(B), A \in 2^\Omega, pl_m^c(\emptyset) = 0$$

$$pl_m^d(A) = \sum_{\emptyset \neq B \subseteq A} (-1)^{|B|+1} q_m^d(B), A \in 2^\Omega, pl_m^d(\emptyset) = 0$$

wherein A and B are subsets of $\Omega$,
$\emptyset$ is the empty set.

2. The method as recited in claim 1, wherein the acquisition of the belief functions is direct, said sensors $c_1, c_2, \ldots, c_n$ giving a belief function directly.

3. The method as recited in claim 1, wherein the acquisition of the belief functions is indirect, said belief functions $m_1, m_2, \ldots, m_n$ being calculated on the basis of the information arising from the sensors $c_1, c_2, \ldots, c_n$.

4. The method as recited in claim 1, wherein the calculation of a probability distribution comprises the following steps:

$$pl_m^c(A) = \sum_{\emptyset \neq B \subseteq A} (-1)^{|B|+1} q_m^c(B), A \in 2^\Omega, pl_m^c(\emptyset) = 0$$

$$pl_m^d(A) = \sum_{\emptyset \neq B \subseteq A} (-1)^{|B|+1} q_m^d(B), A \in 2^\Omega, pl_m^d(\emptyset) = 0$$

the calculation of probability distributions $P_m^c$ and $P_m^d$ on the basis of the plausibility functions $pl_m^c$ and $pl_m^d$,
the probability distributions $P_m^c$ and $P_m^d$ uses the following equations:

$$P_m^c(\{\omega_k\}) = \kappa^{-1} pl_m^c(\{\omega_k\}), \forall \omega_k \in \Omega \text{ with } \kappa = \sum_{\omega_k \in \Omega} pl_m^c(\{\omega_k\})$$

$$P_m^d(\{\omega_k\}) = \kappa^{-1} pl_m^d(\{\omega_k\}), \forall \omega_k \in \Omega \text{ with } \kappa = \sum_{\omega_k \in \Omega} pl_m^d(\{\omega_k\})$$

the calculation of a merged probability distribution $P_m$ corresponding to the merged latent belief structure and calculated on the basis of the probability distributions $P_m^c$ and $P_m^d$.

5. The method as recited in claim 4, wherein the calculation of the commonality functions $q_m^c$ and $q_m^d$ uses the following equations:

$$q_m^c(B) = \prod_{B \not\subset A \subset \Omega} w_m^c(A)$$

$$q_m^d(B) = \prod_{B \not\subset A \subset \Omega} w_m^d(A).$$

6. The method as recited in claim 4, wherein the calculation of the merged probability distribution $P_m$ uses the following equation:

$$P_m(\{\omega_k\}) = \kappa^{-1} P_m^c(\{\omega_k\}) / P_m^d(\{\omega_k\})$$

$$\text{with } \kappa = \sum_{\omega_k \in \Omega} P_m^c(\{\omega_k\}) / P_m^d(\{\omega_k\}).$$

7. A device for merging information comprising:
a computer processor configured to apply belief functions $m_1, m_2, \ldots, m_n$ to information from sensors coupled to the processor,
wherein the processor is also configured to merge results from the belief functions $m_1 \ldots m_n$,
and wherein the processor is further configured to determine the probability distribution based on calculating plausibility functions $pl_m^c$ and $pl_m^d$ on the basis of the commonality functions $q_m^c$ and $q_m^d$, by using the following equations:

$$pl_m^c(A) = \sum_{\emptyset \neq B \in A} (-1)^{|B|+1} q_m^c(B), A \in 2^\Omega, pl_m^c(\emptyset) = 0$$

$$pl_m^d(A) = \sum_{\emptyset \neq B \in A} (-1)^{|B|+1} q_m^d(B), A \in 2^\Omega, pl_m^d(\emptyset) = 0$$

wherein A and B are subsets of $\Omega$,
Ø is the empty set.

8. A system for merging information comprising:
at least two sensors collecting data and providing information,
a computer processor linked to the sensors for merging information originating from said sensors,
wherein said sensors are non-independent and wherein the processor for merging information is configured to:
apply belief functions $m_1, m_2, \ldots, m_n$ to information from sensors coupled to the processor,
wherein the processor is also configured to merge results from the belief functions $m_1 \ldots m_n$,
and wherein, the processor is further configured to determine the probability distribution based on calculating plausibility functions $pl_m^c$ and $pl_m^d$ on the basis of the commonality functions $q_m^c$ and $q_m^d$, by using the following equations:

$$pl_m^c(A) = \sum_{\emptyset \neq B \in A} (-1)^{|B|+1} q_m^c(B), A \in 2^\Omega, pl_m^c(\emptyset) = 0$$

$$pl_m^d(A) = \sum_{\emptyset \neq B \in A} (-1)^{|B|+1} q_m^d(B), A \in 2^\Omega, pl_m^d(\emptyset) = 0$$

wherein A and B are subsets of $\Omega$,
Ø is the empty set.

\* \* \* \* \*